United States Patent [19]
Osborne

[11] 3,870,265
[45] Mar. 11, 1975

[54] BASE MOUNTING FOR INSTRUMENTS AND MACHINES TO BE TILTED

[75] Inventor: George H. Osborne, Artarmon, New South Wales, Australia

[73] Assignee: R. E. Miller Pty. Limited, Artarmon, New South Wales, Australia

[22] Filed: Aug. 17, 1973

[21] Appl. No.: 389,129

[52] U.S. Cl.................. 248/183, 403/87, 403/103
[51] Int. Cl........................................... F16m 11/12
[58] Field of Search................... 248/179, 183–186, 248/278, 291, 293; 403/84, 87, 91, 93, 103

[56] References Cited
UNITED STATES PATENTS

| | | | |
|---|---|---|---|
| 2,459,040 | 1/1949 | Miller | 248/183 |
| 2,500,048 | 3/1950 | Stoiber | 248/184 |
| 2,556,598 | 6/1951 | Rasine | 248/179 |
| 2,882,001 | 4/1959 | Ries et al. | 248/183 |
| 3,552,775 | 1/1971 | Warner | 403/378 X |
| 3,592,429 | 7/1971 | Miller et al. | 248/179 |
| 3,712,571 | 1/1973 | Miller et al. | 248/183 |

Primary Examiner—Roy D. Frazier
Assistant Examiner—William E. Lyddane
Attorney, Agent, or Firm—Emory L. Groff, Jr.

[57] ABSTRACT

A mounting for an instrument which has to be tilted in the operation of aligning the instrument with an object. The mounting comprising a piston fluid tightly mounted in a housing so as to be axially restrained but rotatable, an instrument support having two legs, the first of which is fixed to the piston and the second of which is rotatably supported on the housing and a releasable clamp means to prevent rotation between the second support leg and the housing.

6 Claims, 3 Drawing Figures

BASE MOUNTING FOR INSTRUMENTS AND MACHINES TO BE TILTED

This invention relates to a base mounting for an instrument or machine which has to be "tilted" in the operation of aligning the instrument or machine with an object.

The tilt function of the above type of device is desirably coupled with the requirements that such movement is effected with smoothness against predetermined and adjustable frictional load and with the facility of being able to lock the tilt quickly and effortlessly.

The necessity for positive locking of the movements of the tilt unit are at once obvious. For example, an operator working with a heavy camera on a set frictional tilt drag may wish to walk away from the camera to adjust the subject. If a positive tilt position lock was not available the camera weight could cause an additional tilt to occur with a possible resultant eccentric load of sufficient magnitude to cause the supporting tripod to overbalance. Damage to the camera would be inevitable under such circumstances.

More conveniently this can be accomplished by a quick release lock for a free pan connection between the pan and tilt units.

The foregoing problems have been overcome by other constructions as covered in U.S. Pat. No. 3,712,571. The present invention provides a construction which is more economic to manufacture and equally as efficient as that covered by the said application. This new construction will now be described with reference to the accompanying drawings in which.

Figure 1:
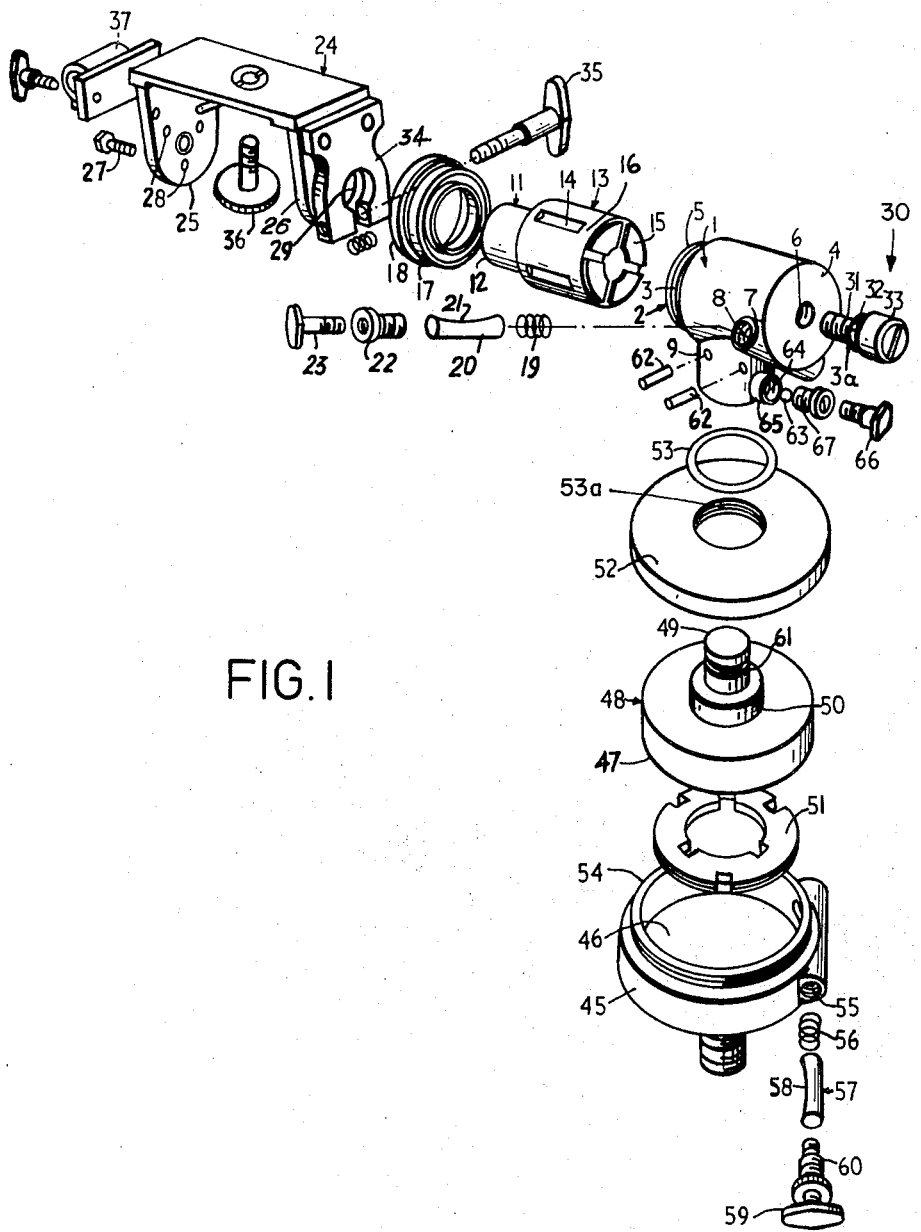
FIG. 1 is an exploded perspective view of one embodiment of the invention.

As illustrated the equipment comprises a tilt unit with a housing 1 having a bore 2 to provide an open end 3 for the body and a closed end 4 for the body. The open end 3 of the body is reduced in diameter and threaded as at 5. The closed end 4 of the body has a threaded hole 6 therein concentric with the bore 2.

A projection 7 on the body has a bore 8 which intersects with the bore 2. A boss 9 on the body has a bore to form a socket whereby the tilt unit can be supported on a mounting system.

A piston 11 with an outside diameter being a working clearance fit with the bore 2 is adapted to be mounted in the body 1. The piston 11 has a reduced diameter end portion 12 leaving a body portion 13 which has peripheral longitudinally extending oil reservoir grooves 14 and end oil grooves 15. The oil grooves 14 terminate short of the end of the piston 11 provided with the grooves 15 to leave an ungrooved peripheral ring portion of the body 16 which, when the piston is disposed in the body 1, overlies the bore 8. An oil seal 17 closely engaging the reduced diameter portion 12 of the piston 11 is such a thickness that when the piston body 13 is disposed in the body bore 2 the oil ring 17 lies flush with the end of the threaded portion 5 of the body 1 so that when a nut 18 is engaged on the threaded portion 5 of the body 1 the piston is sealed within the body 1 in a manner which permits viscous liquid in the body 1 to lubricate the piston but not escape from the bore 2. The nut 18 prevents axial movement of the piston 11 whilst permitting relative rotary movement of the piston 11 within the bore 2.

A tensioning assembly of known type is provided whereby the speed of rotation of the piston 11 can be retarded beyond the speed determined by the viscous drag of the liquid in the bore 2.

The tensioning assembly comprises a spring 19 which is disposed at the bottom end of the bore 8, a brake shoe 20 in the form of a rod of brass or like material having arcuate cut out 21 which is of the same radius of curvature as the body 13 of the piston 11. The brake shoe 20 is also disposed in the bore 8 with the portion 21 in part encirclement of the ring portion 16 of the piston 11. The brake shoe 20 is retained within the bore 8 by means of an internally and externally threaded retainer 22 which is screwed into the bore 8 and receives into its internal bore a threaded actuator 23. By engagement of the actuator 23 with the end of the brake shoe 20 the brake shoe 20 can be positioned to provide working clearance between the piston ring portion 16 and the arcuate cut out 21 of the brake shoe 20, by screwing member 23 hard against the end of the brake shoe 20 the curved portion 21 thereof can be forced into engagement with the ring portion 16 of the piston.

In this way an additional and predetermined degree of resistance to rotation of the piston 11 in the bore 2 can be provided.

A camera or instrument mounting U shaped bridge 24 is mounted on the body 1. The bridge 24 has legs 25 and 26. The leg 25 is fastened to the end of the portion 12 of the piston 11 by means of three screws 27 which pass through holes 28 in the leg 25 to engage in threaded holes (not shown) in the end of the portion 12 of the piston 11. The leg 26 has a hole 29 therethrough which is dimensioned to engage a stub axle 30. The stub axle 30 comprises a threaded portion 31 which engages in the threaded hole 6 in the body 1, a cylindrical parallel body portion 32, which is dimensioned to engage in the bore 29 of the leg 26, and a head portion 33. The head portion 33 is encircled by a split clamp member 34 fastened to the outer surface of the leg 26 in any convenient manner and having a clamp screw 35 whereby the clamp 34 may be clamped onto the head 33.

It follows from the foregoing that the mounting bridge member 24, with the clamp 34 released, can be tilted as the piston 11 rotates within the body 1, but will (when the clamp 34 is tightened up) be prevented from tilting.

The bridge member 24 can be provided with any form of instrument mounting screw illustrated diagrammatically as 36 and may also include handle adapting clamp assemblies 37, again of any suitable type.

Although described as having a tensioning assembly of the type comprising the components 19 to 23 the tilt unit may incorporate a radially dispoed shoe assembly of the type disclosed in U.S. Pat. No 3,712,571 for use as a tensioning means any other suitable form of device e.g. friction pads mounted within the bore 2 and forced together by an axial screw of plunger acting through the piston 11 would be satisfactory but less effective as a tensioning device.

The foregoing construction may be varied without departing from the spirit of the invention in the following ways.

Figure 2:
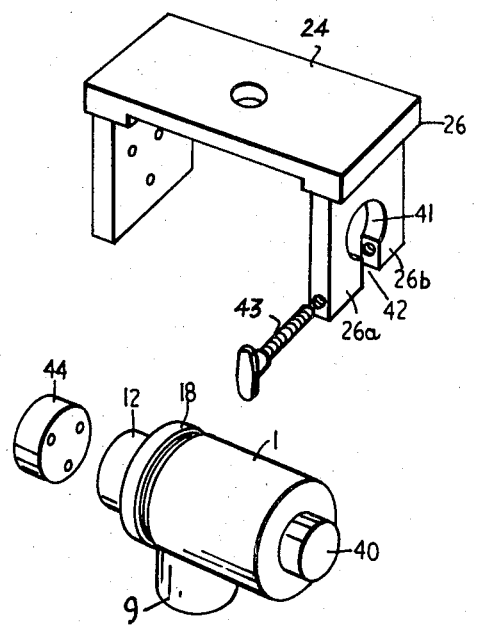
FIG. 2 is a fragmentary perspective view of a second embodiment of the invention and FIG. 3 is a perspective view of an alternative form of housing component.

The body may include a hub 40 (see FIG. 2) which will replace the member 30 threaded into body hole 6.

The bridge leg 26 has a hole 41 therethrough dimensioned to be a frictional fit on the hub 40. A split 42 extends from the extremity of leg 26 to the hole 41 to form leg parts 26a and 26b. A clamp screw 43 cooperates with the parts of the leg 26 resulting from the split 42 in the same way a screw 35 co-operated with the clamp 34 as explained previously. By tightening screw 43 the leg parts 26a and 26b are drawn together to clamp onto hub 40 thereby locking the bridge 24 against tilting rotational movement relative to the body 1. By slackening off screw 43 the bridge member 24 can be tilted rotationally relative to the body 1.

In order that the body 1 may be mounted in the bridge 24 a spacer 44 is provided. The assembly procedure is as follows, the body and piston unit 1–11 is located between the legs 25 and 26 of bridge 24 and moved longitudinally to insert hub 40 in the hole 41 in leg 26. This leaves a space between the end of the portion 12 of piston 11 and the inner face of leg 25. The spacer 44 is inserted into this space and the screws 27 (which pass through holes in the spacer 44) are used to clamp the leg 25 to the piston 11.

Figure 3:
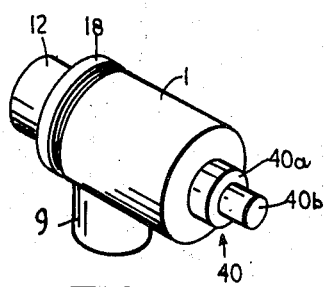

In still another modification a bridge as illustrated in FIG. 1 would be used in combination with a body 1 with a hub 40. The hub in this case (see FIG. 3) is preferably stepped having a larger diameter portion 40a adjacent the body end 4 and supported in hole 29 in the leg 26 and a smaller diameter portion 40b which would be engaged by the clamp 34. The spacer 44 would be required and would be of necessity be thicker than that required where the leg 26 is split and constitutes the clamp.

The mounting system for the tilt unit may comprise a pan unit coupled to the tilt unit so as to provide the possibility of viscous drag panning of the tilt unit or drag free panning of the tilt unit.

As illustrated the pan unit comprises a body 45 having a bore 46 in which there is rotatably mounted a piston 47 having an extension 48 which is stepped to provide two portions 49 and 50. The piston 47 is counterbored on its underface to receive a liquid distributor 51. The piston is maintained in a liquid tight condition in the body by means of a nut 52 having a seal 53 which is normally located in a groove in the nut bore 53a and which encircles the portion 50 of the piston. The nut 52 is screwed onto a portion 54 of the body 45. The nut also prevents axial movement of the piston 47 whilst permitting rotary movement thereof.

A tension device of known type may be mounted in a boss 55 on the body 45, the tensioning assembly comprising a spring 56, a brake shoe 57 having a curved cut out 58 which partly embraces the periphery of the piston 47. The position of the brake shoe being controlled by an actuator 59 screwed into a threaded bush 60 in turn screwed into the hole in the boss 55 which accommodates the components 56 and 57.

The portion 49 has a peripheral groove 61. The portion 49 fits into the socket in the boss 9 of the body 1 and is axially retained by means of pins 62 intersecting the socket and lying in the groove 61 of the piston portion 49. Relative rotation between the piston portion 49 and the socket in the boss 9 is prevented or permitted as required by means of a brake pad 63 in a hole 64 in a boss 65, the hole 64 intersecting the socket. The brake pad is forced into engagement with the periphery of the portion 49 of the piston 47 by means of an actuator 66 threaded into a bush 67 threaded into the hole 64.

Other alternative quick release lock devices may be used as required to couple the tilt and pan units.

I claim:

1. A mounting for an instrument or machine which has to be tilted in the operation of aligning the instrument or machine with an object, said mounting comprising a housing, a cylindrical bore in the housing, a cylindrical piston in the housing bore, the piston periphery having working clearance from the bore periphery, a cylindrical extension of the piston concentric with the piston body and projecting beyond the housing, retaining means having a hole therethrough fixed to the housing with the cylindrical piston body extension passing through the retaining means hole, said retaining means restraining the piston against axial movement but permitting rotary movement thereof, sealing means held in position by the retaining means and sealing the housing to render it liquid tight, means on the housing whereby the housing is mountable on a mounting system; machine support, a first leg on said machine support fixed to the piston extension, a second leg on the support, a stub axle on the housing axially aligned with the piston, a hole in the second leg of the support engaging the stub axle and clamp means to lock the second leg of the support to the stub axle so as to prevent rotary movement of the piston in the housing.

2. A mounting as claimed in claim 1 wherein said clamp means includes a split through the support second leg extending from the hole therein and a threaded member to draw the portions of the second leg separated by the split together to releasably lock the second leg of the support to the stub axle.

3. A mounting as claimed in claim 1 wherein said clamp means includes a releasable split clamp assembly fixed to the second leg of the support to lock the second leg of the support to the stub axle.

4. A mounting as claimed in claim 1 including a releasable connection between the stub axle and the housing whereby the stub axle can be removed from the housing to permit the housing to be installed between the legs of the support after which the stub axle is inserted through the hole in the support second leg and reconnected with the housing.

5. A mounting as claimed in claim 1 wherein the overall length of the assembled piston and housing in the direction of the piston axis is less than the distance between the support legs, and including a spacer adapted to be clamped between the support first leg and the piston after the stub axle is engaged in the hole in the support second leg.

6. A mounting as claimed in claim 1 wherein said mounting system is a pan unit adapted to be fixed to a tripod or like base, said pan unit comprising a body, a cylindrical bore in said pan body, a cylindrical piston in the bore of said pan body, the piston periphery having working clearance from the pan body bore periphery, a cylindrical extension of the pan piston concentric therewith and projecting beyond said pan body, retaining means having a hole therethrough fixed to said pan body with the cylindrical extension of said pan piston passing through the retaining means hole, said retaining means restraining the pan piston against axial movement but permitting rotary movement thereof, sealing means held in position by the retaining means and sealing the pan body bore to render it liquid tight, said pan piston extension being dimensioned to engage in a socket in the mounting housing and means to releasably lock the mounting housing to said piston extension of said pan unit.

* * * * *